G. CRAWFORD & T. VEITCH.
SPRING WHEEL.
APPLICATION FILED JAN. 31, 1911.
1,027,105.
Patented May 21, 1912.
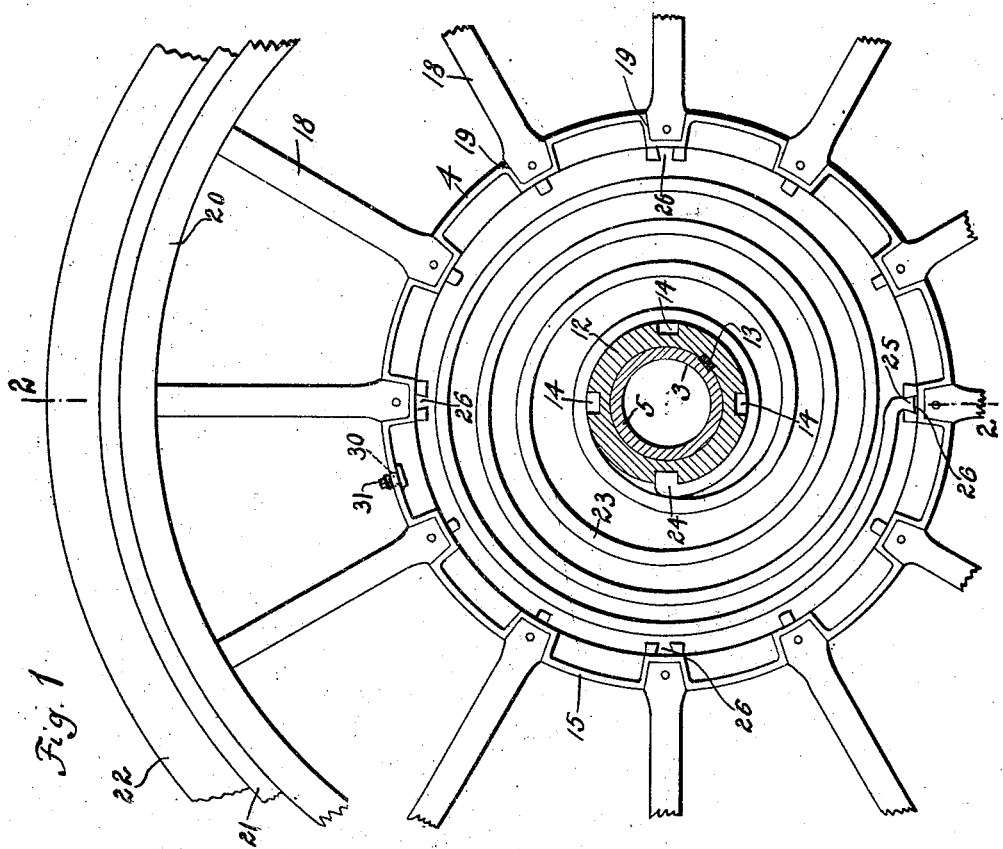
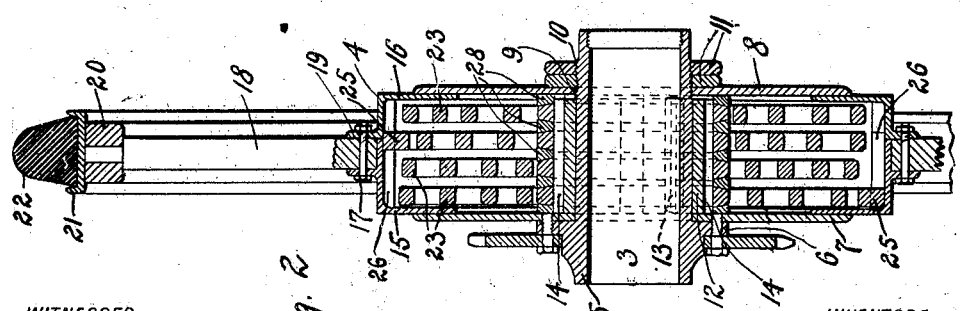
WITNESSES
INVENTORS
George Crawford & Thomas Veitch
BY
Sigmund Herzog
ATTORNEY

UNITED STATES PATENT OFFICE.

GEORGE CRAWFORD, OF NEW YORK, N. Y., AND THOMAS VEITCH, OF DUMONT, NEW JERSEY; SAID VEITCH ASSIGNOR TO SAID CRAWFORD.

SPRING-WHEEL.

1,027,105.  Specification of Letters Patent.  Patented May 21, 1912.

Application filed January 31, 1911. Serial No. 605,675.

*To all whom it may concern:*

Be it known that we, GEORGE CRAWFORD and THOMAS VEITCH, citizens of the United States, and residents of the city of New York, in the county of New York and State of New York, and Dumont, in the county of Bergen and State of New Jersey, respectively, have invented certain new and useful Improvements in Spring-Wheels, of which the following is a specification.

The present invention relates to wheels for vehicles, and more particularly to wheels, the hubs of which are connected to the wheel proper by means of spiral springs.
In wheels of this character the springs are connected with the two sections of the hub, and, in those heretofore in use the connection between the inner ends of the springs and the hub portion are such that the springs tend to unwind from the hub on the backward movement of the vehicle, causing thereby a leverage at the point of connection, which is apt to break the springs, causing thereby serious trouble. Another defect of the spring wheels of this type, heretofore in use, consists in the fact that, if a plurality of springs is employed, the spacing means for holding the same the required distance apart is either ineffective in its operation, or interferes with the proper action of the springs.

It is now one of the objects of the present invention to provide a wheel with a spring yielding hub and with means for obviating the defects hereinbefore mentioned.

Another object of the invention is to produce a spring wheel, which can be used both upon heavy and light vehicles, and without any material structural changes in the wheel.

A further object of the invention is to provide a wheel of the character specified which can be easily assembled, even without the aid of a skilled mechanic.

A still further object of the invention is to generally improve and simplify the construction of the wheels heretofore in use, so that the same can be manufactured on a commercial scale, or in other words which are so simple to produce as not to be beyond the reasonable cost of such a device.

With these and other objects in view, which will more fully appear as the nature of the invention is better understood, the same consists in the combination, arrange- ment and construction of parts hereinafter fully described, pointed out in the appended claims and illustrated in the accompanying drawings, it being understood that many changes may be made in the size and proportion of the several parts and minor details of construction without departing from the spirit or sacrificing any of the advantages of the invention.

One of the many possible embodiments of the invention is illustrated in the accompanying drawings, in which:—

Figure 1 is a side elevation of a portion of one of the improved wheels with some of the parts removed therefrom, and Fig. 2 is a section taken on line 2, 2 of Fig. 1.

The hub of the wheel comprises an inner section 3 and an outer section 4, which are movable relative to each other in a direction at right angles to the axis of the wheel axle, and are normally held in their concentric or nearly concentrical positions by yielding means hereinafter to be described.

The section 3 of the hub comprises a tubular member 5, having a vertically disposed flange 6, to which is attached a disk 7. A similar disk 8 is provided with a screw threaded centrally arranged hole 9, the threads of which mesh with the screw threaded end 10 of the tubular member 5. The disk 8 is held in its proper position by means of lock nuts 11, 11, which engage also the screw threaded end 10 of said tubular member 5. The disks 7 and 8 are spaced apart a distance which is equal to the thickness of the movable section 4 of the hub. A sleeve 12, surrounding the member 5, is arranged between the disks 7 and 8, and attached thereto, for instance, by means of a key 13. This sleeve is provided with a plurality of transverse grooves 14, 14 running in a direction of the longitudinal axis of said sleeve. These grooves are arranged at equal distances in the sleeve, and are of a number which corresponds to that of the springs used upon the wheel.

The movable section of the hub is ring shaped and comprises two parts 15 and 16, which are united by means of screw bolts 17, or other fastening devices, which engage at the same time the spokes 18 of the wheel. The inner ends of these spokes are seated in sockets 19, formed upon the movable section of the hub, while their outer ends are connected to the felly 20 in the usual manner. Upon this felly is shrunk or otherwise secured a rim 21, carrying a solid rubber tire 22 of the well known construction.

It will be observed from the drawings that the section 3 of the hub is concentrically arranged upon the wheel axle and remains always in such position, while the section 4 is adapted to move relative to the section 3 in a direction at right angles to the axis of the axle. The two hub sections are united by resilient means, more particularly by a plurality of springs 23, in the present case four. Each of these springs, preferably made of steel, is of a cross section depending upon the type and weight of the vehicle upon which the wheel is to be used. The springs are provided upon both ends with lugs 24 and 25, respectively. The lugs 24 are engaged with their corresponding grooves 14, while the lugs 25, which are dove-tailed, are inserted into notches 26 in the movable section 4 of the hub. These notches are arranged equi-distantly around the inner surface of the movable section of the hub and correspond in number to the number of the grooves 14. The springs are wound in the same directions, so as not to oppose the actions of each other, and are fastened equidistantly around the peripheries of the two hub sections, to cause equal pressure around the periphery of the wheel. The cross sections of the innermost convolutions of the springs 23 are trapeziform; the larger of the two parallel sides of the trapezia contacting with the sleeve 12. The springs are spaced apart by rings 28, which are also of trapeziform cross section. The inclined sides of the rings contact with the inclined sides of the trapeziform cross sections of the innermost convolutions of the springs 23. These rings are in engagement with almost the whole of the smallest convolutions of the springs, whereby the latter are safely kept upon the sleeve 12, both in radial and lateral directions, not only when the vehicle runs forward, but also when backward. The strain, to which the points of attachment of the springs to the hub section 3 are subjected, is divided all over the first convolutions of the springs. There is, therefore, less danger of breakage.

The wheel is assembled as follows: The disk 7 is attached to the flange 6, and the hub section 15 with the spokes and the wheel placed in position upon the disk 7. The ring contacting with the disk 7 is then engaged with the sleeve 12, whereupon alternately the springs and other rings 28 are brought into their proper places. The lugs of the springs are seated in their corresponding grooves 14 and notches 26. The section 16 of the movable portion of the hub is then secured to the section 15, and finally the disk 8 and the locking nuts 11, 11 brought into place, whereby the wheel is completed. By means of these springs the desired resiliency of the wheel is obtained, the movable member of the hub yielding easily to obstructions in the road and being brought back to its normal position without communicating the jar or shock to the wheel axle and thus to the body of the vehicle arranged thereon.

While herein four springs have been shown, it is to be understood that a greater or lesser number of springs may be used, according to the requirements. The cross sections of the springs may also be greatly varied as the wheel is used upon heavy or lighter vehicles.

The hub may be filled with oil or other lubricating material through an opening 30, which is then closed by a plug 31.

What we claim is:

1. In a spring wheel hub, the combination with an axle carrying inner member, of a spoke carrying outer member capable of movement relatively to said inner member, a plurality of springs mounted side by side upon said inner member and attached to both members, and wedging rings for spacing apart said springs and keeping almost their entire smallest convolutions continuously in contact with said inner member.

2. In a spring wheel hub, the combination with an axle carrying inner member, of a spoke carrying outer member capable of movement relatively to said inner member, a sleeve secured to said inner member, a plurality of springs mounted side by side upon said sleeve and attached to the latter and said outer member, the smallest convolutions of said springs being of trapeziform cross section, and rings of trapeziform cross section arranged between said springs upon said sleeve, the inclined sides of said rings contacting throughout their length with the inclined sides of the smallest convolutions of said springs, whereby the latter are spaced apart and almost their entire smallest convolutions constantly kept in contact with said sleeve.

Signed at New York, in the county of New York and State of New York, this 20th day of January, A. D. 1911.

GEORGE CRAWFORD.
THOMAS VEITCH.

Witnesses:
HENRY J. CRAWFORD,
SIGMUND HERZOG.